(12) United States Patent
Shin et al.

(10) Patent No.: US 12,322,181 B2
(45) Date of Patent: Jun. 3, 2025

(54) METHOD AND APPARATUS FOR EXTRACTING A FINGERPRINT OF VIDEO HAVING A PLURALITY OF FRAMES

(71) Applicant: NAVER CORPORATION, Seongnam-si (KR)

(72) Inventors: Seong Hyeon Shin, Seongnam-si (KR); Jisu Jeon, Seongnam-si (KR); Dae Hwang Kim, Seongnam-si (KR); Jongeun Park, Seongnam-si (KR); Seung-bin Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 317 days.

(21) Appl. No.: 17/820,359

(22) Filed: Aug. 17, 2022

(65) Prior Publication Data

US 2023/0059442 A1 Feb. 23, 2023

(30) Foreign Application Priority Data

Aug. 18, 2021 (KR) .................. 10-2021-0109089

(51) Int. Cl.
*G06V 10/00* (2022.01)
*G06V 10/75* (2022.01)
*G06V 20/40* (2022.01)

(52) U.S. Cl.
CPC ............ *G06V 20/48* (2022.01); *G06V 10/753* (2022.01); *G06V 20/41* (2022.01); *G06V 20/46* (2022.01)

(58) Field of Classification Search
CPC ...... G06V 20/48; G06V 10/753; G06V 20/41; G06V 20/46; G06V 10/431; G06V 20/80; H04N 21/23892; G06T 2207/20052
See application file for complete search history.

(56) References Cited

U.S. PATENT DOCUMENTS

| 7,006,655 B2 | 2/2006 | Taniguchi et al. |
| 8,942,413 B2 | 1/2015 | Anan et al. |
| 8,989,376 B2 | 3/2015 | Ren et al. |

(Continued)

FOREIGN PATENT DOCUMENTS

| JP | 2002111994 A | 4/2002 |
| JP | 2009081827 A | 4/2009 |
| JP | 2012142741 A | 7/2012 |

(Continued)

OTHER PUBLICATIONS

Na et al., "Image Fingerprint for Contents based Video Copy Detection Using Block Comparison," Dept. of Electronic Engineering, Inha University, Dec. 21, 2009, 9 pages (English abstract included).

(Continued)

*Primary Examiner* — Vu Le
*Assistant Examiner* — Zaid Muhammad Saleh
(74) *Attorney, Agent, or Firm* — Greer Burns & Crain Ltd.

(57) ABSTRACT

A method for extracting a fingerprint of a video having a plurality of frames includes obtaining a plurality of pixel value matrices from each of the plurality of frames, calculating maximum values of average pixel values in each axis of the plurality of pixel value matrices for each of the plurality of frames, and calculating the fingerprint of the video based on a temporal correlation of the maximum values calculated for the plurality of frames.

17 Claims, 8 Drawing Sheets

(56) References Cited

U.S. PATENT DOCUMENTS

2020/0342023 A1* 10/2020 Diggins ............. G06F 16/5854

FOREIGN PATENT DOCUMENTS

| KR | 20140130213 A | 11/2014 |
|----|---------------|---------|
| KR | 101778530 B1 | 9/2017 |

OTHER PUBLICATIONS

Korean Patent Office, "Notice of Allowance," issued in connection with Korean Patent Application No. 10-2021-0109089, dated Aug. 23, 2023, 6 pages.

Japanese Patent Office, "Notice of Allowance," issued in connection with Japanese Patent Application No. 2022-129968, dated Oct. 10, 2023, 5 pages.

* cited by examiner

610

620

710

720

METHOD AND APPARATUS FOR EXTRACTING A FINGERPRINT OF VIDEO HAVING A PLURALITY OF FRAMES

CROSS-REFERENCE TO RELATED APPLICATION

This application claims priority to Korean Patent Application No. 10-2021-0109089, filed in the Korean Intellectual Property Office on Aug. 18, 2021, the entire contents of which are hereby incorporated by reference.

BACKGROUND OF THE INVENTION

Field of Invention

The present disclosure relates to a method and an apparatus for extracting a fingerprint of a video having a plurality of frames, and specifically, to a method and an apparatus for calculating maximum values of average pixel values in each axis for each of a plurality of frames included in a video, and calculating a fingerprint of the video based on a temporal correlation of the calculated maximum values.

Description of Related Art

Recently, consumption of video content has greatly increased and various video platforms have appeared, creating an environment in which users can easily and conveniently create, share, and watch video content. In this environment, as increasing number of video contents are produced and distributed by various users, unauthorized copies and distributions of videos have also increased, along with the need for copyright protection for videos.

Various content verification methods may be used to track illegal distributors or possible illegal distribution of video content shared or sold on video platforms. For example, for a video verification system that utilizes fingerprinting or video fingerprinting, a watermark-based fingerprinting method that inserts owner information, and the like in the content, or a fingerprinting method based on feature points extracted from the content may be used. According to the feature point-based fingerprint method, it is possible to extract the feature points such as frequency components, screen change information, location information, and the like from the content such as music and video, store them in a database, and compare them with the feature points extracted from another content to determine whether or not the two contents are the same or similar to each other.

By using such a video content verification method, if an illegal distributor identically copies and distributes the original video, it is possible to easily identify the sameness or similarity of the original video and the duplicate video. However, unauthorized distributors exploit the characteristics of this video content verification method to copy the original video and apply various alterations to the copied video to invalidate the existing verification method. For example, if an illegal distributor copies the original video and flips the copied video left and right or up and down, or reduces the copied video and inserts a meaningless background (e.g., a black screen) and distributes it, there is a problem that existing video fingerprint extraction methods cannot easily identify the illegal distribution of the video with these alterations.

BRIEF SUMMARY OF THE INVENTION

In order to address one or more problems (e.g., the problems described above and/or other problems not explicitly described herein), the present disclosure provides a method for, a non-transitory computer-readable recording medium storing instructions for, and an apparatus (system) for extracting a fingerprint of a video including a plurality of frames.

The present invention may be implemented in a variety of ways, including a method, an apparatus (system), or a non-transitory computer-readable recording medium storing instructions.

A method for extracting a fingerprint of a video including a plurality of frames is provided, which may be executed by one or more processors and include obtaining a plurality of pixel value matrices from each of the plurality of frames, calculating maximum values of average pixel values in each axis of the plurality of pixel value matrices for each of the plurality of frames, and calculating the fingerprint of the video based on a temporal correlation of the maximum values calculated for the plurality of frames.

There is provided a non-transitory computer-readable recording medium storing instructions for executing the method on a computer.

A computing device is provided, which may include a memory; and one or more processors connected to the memory and configured to execute one or more computer-readable programs included in the memory, in which the one or more programs may include instructions for obtaining a plurality of pixel value matrices from each of a plurality of frames included in a video; calculating maximum values of average pixel values in each axis of the plurality of pixel value matrices for each of the plurality of frames, and calculating the fingerprint of the video based on a temporal correlation of the maximum values calculated for the plurality of frames.

According to some examples of the present disclosure, by identifying a tampered video that is altered from an original video to avoid copyright infringement claims, it is possible to strengthen the copyright protection of the video.

According to some examples of the present disclosure, by calculating a fingerprint of a video based on the temporal correlation of the maximum values of the average pixel values in each axis, it is possible to effectively identify whether or not the video being identified is a tampered video.

According to some examples of the present disclosure, it is also possible to identify whether or not a video is a tampered video even if the video is flipped left and right and/or up and down, or the video is reduced and inserted with a meaningless background, which could not be identified by known methods, because the fingerprint of the video can be the same or similar to that of the original video.

The effects of the present disclosure are not limited to the effects described above, and other effects not described herein can be clearly understood by those of ordinary skill in the art from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION OF THE INVENTION

Figure 1:
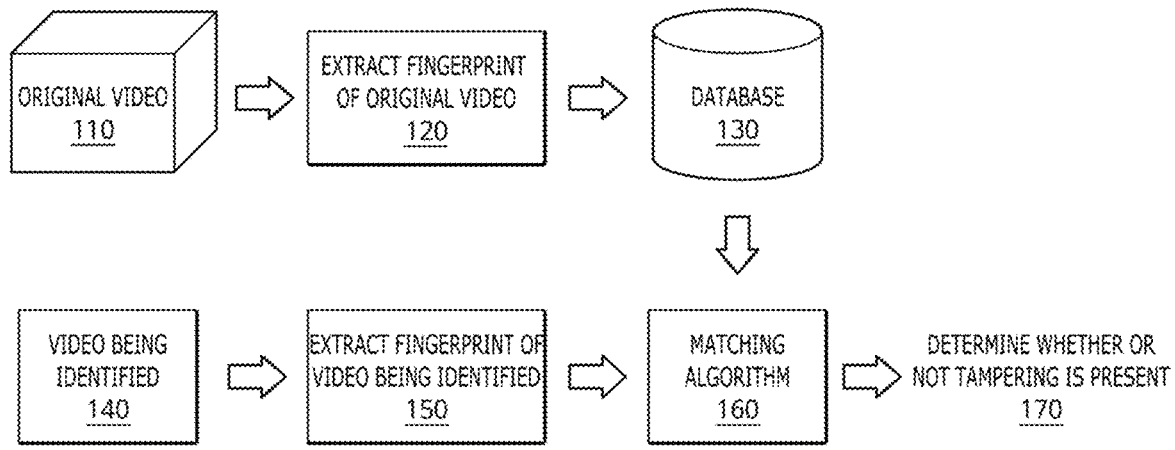
FIG. 1 is a diagram illustrating an example of a method of a computing device for identifying whether or not a video is a tampered video.

Hereinafter, examples for the practice of the present invention will be described in detail with reference to the accompanying drawings. However, in the following description, detailed descriptions of well-known functions or configurations will be omitted if they make the subject matter of the present disclosure unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components be excluded from the invention.

Advantages and features of the disclosed examples and methods of accomplishing the same will be apparent by referring to examples described below in connection with the accompanying drawings. However, the present invention is not limited to the examples disclosed below, and may be implemented in various forms different from each other, and the examples are merely provided to make the present invention complete, and to fully disclose the scope of the invention to those skilled in the art to which the present disclosure pertains.

The terms used herein will be briefly described prior to describing the disclosed embodiment(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the embodiment(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary. In the present disclosure, "each of a plurality of A" may refer to each of all components included in the plurality of A, or may refer to each of some of the components included in a plurality of A.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, "frames" may include still images forming an image or a video. As an example, the "frame" may be referred to as an "image". In addition, the image or the video may include frames including a plurality of still images obtained by capturing an image of a subject or the like at regular time intervals.

In the present disclosure, "fingerprint of a video" may refer to a key feature extracted from the video or may refer to a means for identifying a same/similar video or a transformed video. A fingerprint of a video that is the same as or similar to the original video or a video transformed from the original may have the same/similar characteristics as the fingerprint of the original video. According to an embodiment, a matching algorithm may determine whether a video is a transformed video (including the same video as the original video) from the original video, by comparing the fingerprint of the transformed video being identified with the fingerprint of the original video.

In the present disclosure, "discrete cosine transform (DCT)" may refer to an operation or calculation of transforming sequenced values into a sum of cosine functions of various frequencies. In DCT, cosine functions of various frequencies may serve as a basis, and DCT coefficients may refer to weights applied to each basis function. In the present disclosure, performing DCT may include calculating DCT coefficients.

FIG. 1 is a diagram illustrating an example of a method of a computing device for identifying whether or not a video is a tampered video. The computing device may obtain a fingerprint of an original video 110. The fingerprint of the original video 110 may refer to the fingerprint of the original video that is extracted by the computing device 120 from the original video 110 and stored in the database 130 as illustrated, or may be the fingerprint received from an external system. For example, the original video 110 may be a video that includes a plurality of frames. The fingerprint of the original video 110 may be extracted according to various examples, which will be described in detail below.

The computing device may extract 150 a fingerprint of a video 140 being identified. For example, the video 140 being identified may be a video including a plurality of frames. The fingerprint of the video 140 being identified may be extracted according to methods for extracting a fingerprint of a video according to various examples which will be described in detail below, or may be extracted according to the same or similar method as the method that is employed to extract the fingerprint of the original video 120.

The computing device may determine 170 whether or not the video being identified is a tampered video, by comparing the fingerprint of the original video 110 with the fingerprint of the video 140 being identified. That is, the computing device may determine whether or not the video being identified is the tampered video of the original video. In this case, the tampering may include applying certain alterations to the original video, such as adding noise to the original video (e.g., Gaussian noise), lowering the quality of the original video, blurring the original video (e.g., Gaussian blur), deleting a part or some frames of the original video (e.g., crop), adjusting the brightness of the original video, applying gamma to the original video (e.g., gamma correction), enlarging or reducing the original video and inserting a meaningless background (e.g., zoom and shift), inverting the original video left and right or up and down, and the like. A video 140 being identified that is identical to the original video 110 may be determined to be the tampered video of the original video.

The computing device may input the fingerprint of the original video 110 and the fingerprint of the video 140 being identified to a matching algorithm 160 to determine 170 whether or not tampering is present. If at least a portion of the fingerprint of the video 140 being identified is the same as, similar to, or within an error range of at least a portion of the fingerprint of the original video 110, the matching algorithm 160 may determine that the video 140 being identified is a tampered video of the original video. For example, if the fingerprint of the original video is [a, b, c, d, e, f, g, h] and the fingerprint of the video being identified is [c, d, e, f, g], the fingerprint of the video being identified is the same as a portion of the fingerprint of the original video (from the 3rd to 7th components of the fingerprint of the original video), and accordingly, the matching algorithm 160 may determine that the video being identified is the tampered video of the original video.

With such a configuration, it is possible to identify a tampered video that is altered from an original video to avoid copyright infringement, and strengthen the copyright protection of the video.

Figure 2:
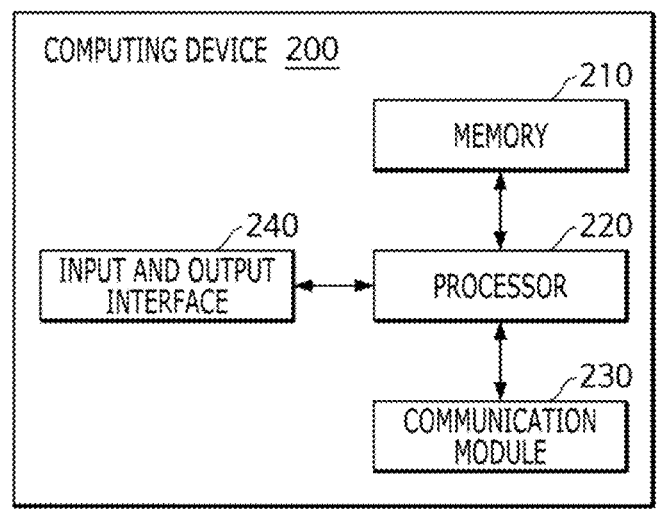
FIG. 2 is a block diagram of an internal configuration of the computing device.

FIG. 2 is a block diagram of an internal configuration of a computing device 200. The computing device 200 may include a memory 210, a processor 220, a communication module 230, and an input and output interface 240. The computing device 200 may be configured to communicate information and/or data through a network by using the communication module 230.

The memory 210 may include any non-transitory computer-readable recording medium. The memory 210 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and the like may be included in the computing device 200 as a separate permanent storage device that is separate from the memory 210. In addition, an operating system and at least one program code (e.g., a code for extracting a fingerprint of a video, identifying whether or not a video is a tampered video, and the like installed and driven in the computing device 200) may be stored in the memory 210.

These software components may be loaded from a computer-readable recording medium separate from the memory 210. Such a separate computer-readable recording medium may include a recording medium directly connectable to the computing device 200, and may include a computer-readable recording medium such as a floppy drive, a disk, a tape, a DVD/CD-ROM drive, a memory card, and the like, for example. In another example, the software components may be loaded into the memory 210 through the communication module 230 rather than the computer-readable recording medium. For example, at least one program may be loaded into the memory 210 based on a computer program (e.g., a program or the like for extracting a fingerprint from a video, identifying whether or not a video is a tampered video, and the like) installed by the files provided by the developers, or by a file distribution system that distributes an installation file of an application through the communication module 230.

The processor 220 may be configured to process the commands of the computer program by performing basic arithmetic, logic, and input and output operations. The commands may be provided to a user terminal (not illustrated) or another external system by the memory 210 or the communication module 230. For example, the processor 220 may obtain a plurality of pixel value matrices from each of a plurality of frames included in a video, calculate maximum values of average pixel values in each axis for each of the plurality of pixel value matrices, and calculate the fingerprint of the video based on the temporal correlation of the calculated maximum values. In addition, the processor 220 may obtain a fingerprint of an original video, extract the fingerprint of a video being identified, and compare the fingerprint of the original video with the fingerprint of the video being identified to determine whether or not the video being identified is a tampered video.

The communication module 230 may provide a configuration or function for the user terminal (not illustrated) and the computing device 200 to communicate with each other through a network, and may provide a configuration or function for the computing device 200 to communicate with an external system (e.g., a separate cloud system). For example, control signals, commands, data, and the like provided under the control of the processor 220 of the computing device 200 may be transmitted to the user terminal and/or the external system through the communication module 230 and the network through the communication module of the user terminal and/or external system. For example, the result of identifying by the computing device as to whether or not the video being identified is the tampered video may be transmitted to an external system (e.g., a copyright management system, and the like).

In addition, the input and output interface 240 of the computing device 200 may serve as a means for interfacing with a device (not illustrated) which may be connected to or included in the computing device 200. In FIG. 2, the input and output interface 240 is illustrated as a component configured separately from the processor 220, but aspects are not limited thereto, and the input and output interface 240 may be configured to be included in the processor 220. The computing device 200 may include more components than those illustrated in FIG. 2. Meanwhile, known components may not necessarily require exact illustration.

The processor 220 of the computing device 200 may be configured to manage, process, and/or store the information and/or data received from a plurality of user terminals and/or a plurality of external systems. The processor 220 may receive a video including a plurality of frames from a user terminal and/or an external system. In this case, the processor may obtain a plurality of pixel value matrices from each of a plurality of frames included in the received video, calculate maximum values of average pixel values in each axis for each of the plurality of pixel value matrices, and calculate the fingerprint of the video based on the temporal correlation of the calculated maximum values.

Figure 3:
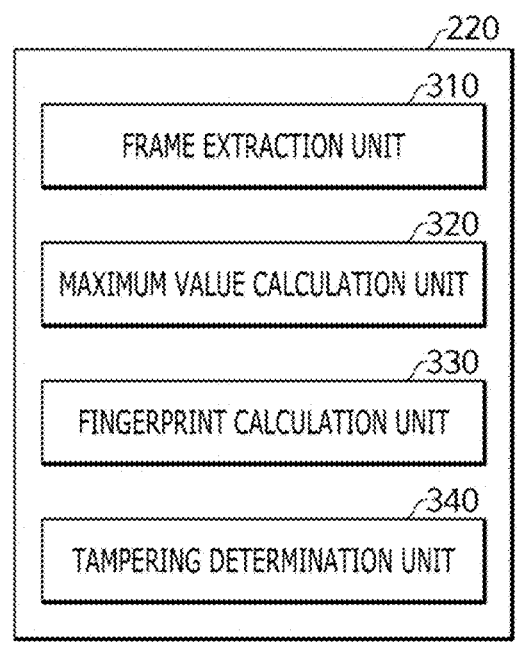
FIG. 3 is a block diagram of an internal configuration of a processor.

FIG. 3 is a block diagram of an internal configuration of the processor 220. As illustrated, the processor 220 may include a frame extraction unit 310, a maximum value calculation unit 320, a fingerprint calculation unit 330, and a tampering determination unit 340. The frame extraction unit 310 may extract a plurality of frames from the video. The frame extraction unit 310 may extract a plurality of frames included in a video. For example, if a video is n seconds in length, with a plurality of frames being generated at predefined time interval, that is, every 1/30 seconds, then the still images (frames) of the video corresponding to 0/30 seconds, 1/30 seconds, 2/30 seconds, 3/30 seconds, and n/30 seconds may be extracted. In another example, if the video is compressed by a specific encoding algorithm, the frame extraction unit 310 may apply a decoding algorithm to the video to extract the frames included in the corresponding video.

The maximum value calculation unit 320 may calculate the maximum values of the averages in each axis of a plurality of pixel value matrices for each of the plurality of frames. The maximum value calculation unit 320 may calculate the average pixel values in the horizontal axes (that is, rows) and the average pixel values in the vertical axes (that is, columns) of the plurality of pixel value matrices for each of the plurality of frames. The maximum value calculation unit 320 may also calculate the maximum values of the average pixel values in the horizontal axis of each frame, and the maximum values of the average pixel values in the vertical axis of each frame. A process in which the maximum value calculation unit 320 calculates the maximum values of the averages for the axes will be described in detail below with reference to FIGS. 4 and 5.

The fingerprint calculation unit 330 may calculate the fingerprint of the video based on the temporal correlation of the maximum values calculated by the maximum value calculation unit 320. The fingerprint calculation unit 330 may perform discrete cosine transform (DCT) on the maximum values calculated for each of the plurality of frames to calculate the fingerprint of the video. For example, the fingerprint calculation unit 330 may calculate a first DCT coefficient by performing the discrete cosine transform on the maximum values of the average pixel values in the horizontal axis of each frame, which is calculated by the maximum value calculation unit 320, and calculate a second DCT coefficient by performing the discrete cosine transform on the maximum values of the average pixel values in the vertical axis of each frame. Then, the fingerprint calculation unit 330 may combine the first DCT coefficient and the second DCT coefficient to generate a fingerprint of the video. Additionally, the fingerprint calculation unit 330 may exclude a coefficient having a basis frequency of 0 from the DCT coefficient calculated by the discrete cosine transform.

If any video is altered into a tampered video, while maintaining the visually important information, the varying pattern of the maximum values of the average pixel values in each axis in the tampered video may be similar to that of the original video. Therefore, as described above, by calculating the fingerprint of a video based on the temporal correlation of the maximum values of the average pixel values in each axis, it is possible to effectively identify whether or not the video being identified is a tampered video. An example of a process in which the fingerprint calculation unit 330 calculates a fingerprint of a video will be described below in detail with reference to FIG. 5.

The tampering determination unit 340 may determine whether or not the video being identified is a tampered video, by comparing the fingerprint of the original video with the fingerprint of the video being identified. The tampering determination unit 340 may input the fingerprint of the original video and the fingerprint of the video being identified into a matching algorithm to determine whether or not tampering is present. If at least a portion of the fingerprint of the video being identified is the same as, similar to, or within an error range of at least a portion of the fingerprint of the original video, the matching algorithm may determine that the video being identified is the tampered video of the original video.

The internal configuration of the processor 220 illustrated in FIG. 3 is only an example, and in some examples, configurations other than the illustrated internal configuration may be additionally included, or some configurations may be omitted, or some processes may be performed by other configurations or external systems. For example, if the frame extraction unit 310 is omitted, a plurality of frames may be received from an external system. As another example, if the tampering determination unit 340 is omitted, the processor 220 may only perform the process of extracting a fingerprint of the video, and whether or not tampering is present may be determined at the external system. In addition, although the internal components of the processor 220 have been described separately for each function in FIG. 3, it does not necessarily mean that they are physically separated.

Figure 4:
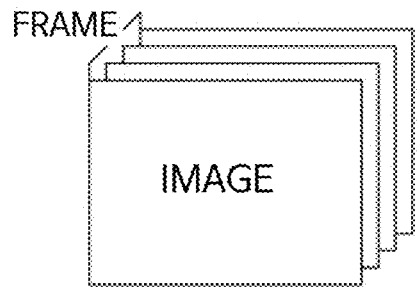
FIG. 4 show diagrams illustrating an example of a method for calculating average pixel values in each axis of a pixel value matrix for a plurality of frames.
Figure 4:
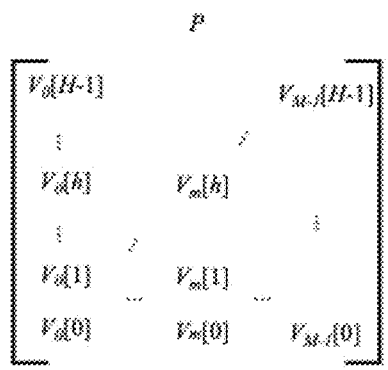
Figure 4:
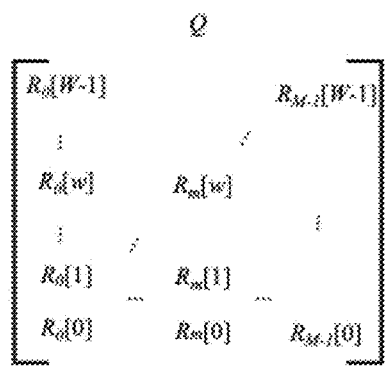

FIG. 4 is a diagram illustrating an example of calculating the average pixel values in each axis of the pixel value matrix for a plurality of frames 410. The computing device 200 may obtain a plurality of pixel value matrices from each of the plurality of frames 410 included in the video, and calculate the average pixel values in each axis of the plurality of pixel value matrices for each of the plurality of frames 410.

As illustrated, the computing device 200 may calculate 420 an average pixel value (V[h], where h is a row index of the plurality of pixel value matrices) in the horizontal axis for each of the plurality of frames 410. For example, the computing device may add all the pixel values of the first row (Img[1][w], where w is the column index of the plurality of pixel value matrices) in the first frame, and divide the sum by the number of horizontal pixels (W) of the frame to calculate the average pixel value of the first row. By performing this process for all rows (that is, H rows) of the first frame, the average pixel values in the horizontal axis of the pixel value matrix of the first frame may be calculated. In addition, by performing this process for all the frames 410, the average pixel values in the horizontal axis for each of the plurality of frames 410 may be calculated 420.

Likewise, the computing device 200 may calculate (430) an average pixel value (R[w], where w is a column index of the plurality of pixel value matrices) in the vertical axis for each of the plurality of frames 410. For example, the computing device may add all the pixel values of the first column (Img[h][1], where h is the row index of a plurality of pixel value matrices) in the first frame, and divide the sum by the number of horizontal pixels (H) of the frame to calculate the average pixel value of the first column. By performing this process for all columns (that is, W columns) of the first frame, the average pixel values in the vertical axis of the pixel value matrix of the first frame may be calculated. In addition, by performing this process for all the frames 410, the average pixel values in the vertical axis for each of the plurality of frames 410 may be calculated (430).

The calculated averages in each axis may be expressed by a matrix P 440 and a matrix Q 450. For example, as illustrated, the average pixel values in the horizontal axis for each of the plurality of frames may be expressed as the matrix 440, where a component (Vm−1[h−1]) of the m-th column and the h-th row represents the average of the h-th row of the m-th frame (the index starts with 0 as illustrated). In addition, as illustrated, the average pixel values in the vertical axis for each of the plurality of frames may be expressed as the matrix 450, where a component Rm−1[w−1] of the m-th column and the w-th row represents the average of the w-th column of the m-th frame (the index starts with 0 as illustrated).

Figure 5:
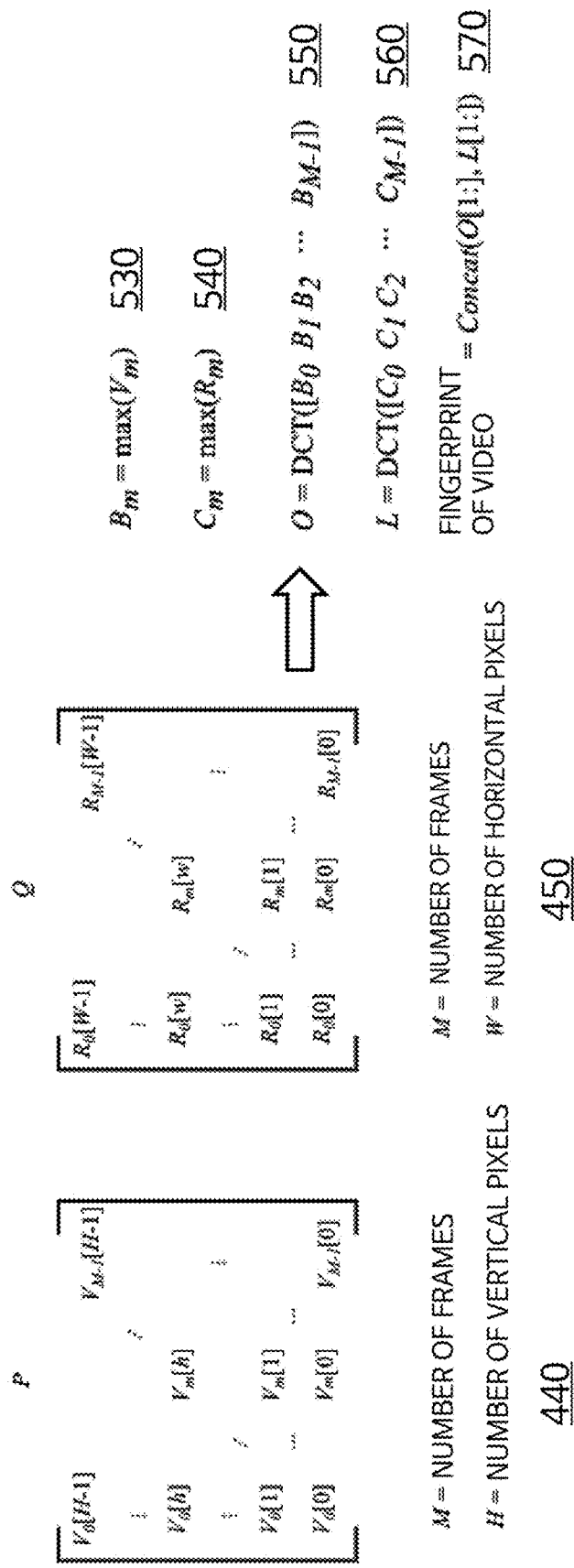
FIG. 5 illustrates an example of a method for calculating a fingerprint of a video.

FIG. 5 illustrates an example of calculating a fingerprint 570 of a video. The computing device 200 may calculate a maximum value of the average pixel values in each axis for each of the plurality of frames. For example, the computing device 200 may calculate a maximum value (Bm) 530 of the average pixel values in the horizontal axis for each of the plurality of frames, and a maximum value (Cm) 540 of the average pixel values in the vertical axis for each of the plurality of frames. In this case, the maximum value (Bm) 530 of the average pixel values in the horizontal axis, and the maximum value (Cm) 540 of the average pixel values in the vertical axis may mean the largest value of the average pixel values (Vm[h], where m is the frame index and h is the row index of the matrix) in the horizontal axis 440 in each frame and the largest value of the average pixel values (Rm[w], where m is the frame index and w is the column index of the matrix) in the vertical axis 450 in each frame. Accordingly, the maximum values (Bm) 530 of the average pixel values in the horizontal axis, and the maximum values (Cm) 540 of the average pixel values in the vertical axis may be calculated, one for each frame, and as many as the total number of frames (M).

The computing device 200 may calculate the fingerprint 570 of the video based on the temporal correlation of the maximum values 530 and 540 calculated for a plurality of frames. The computing device 200 may perform discrete cosine transform on the maximum values 530 and 540 calculated for a plurality of frames to calculate the fingerprint 570 of the video. For example, as illustrated, the maximum values 530 (B0, B1, B2, . . . , BM−1) of the average pixel values in the horizontal axis of each frame may be arranged in frame order (in chronological order), and the discrete cosine transform may be performed thereon to calculate a first DCT coefficient 550. In addition, the maximum values 540 (C0, C1, C2, . . . , CM−1) of the average pixel values in the vertical axis of each frame may be arranged in frame order, and the discrete cosine transform may be performed thereon to calculate a second DCT coefficient 560. Then, the first DCT coefficient 550 and the second DCT coefficient 560 may be combined to generate the fingerprint 570 of the video. Among the DCT coefficients 550 and 560, a coefficient having a basis frequency of 0 has no significance in identifying video tampering, and thus may be excluded when generating a fingerprint of the video. The fingerprint 570 of the video extracted by the method described above may be used to identify whether or not the video is a tampered video.

Figure 6:
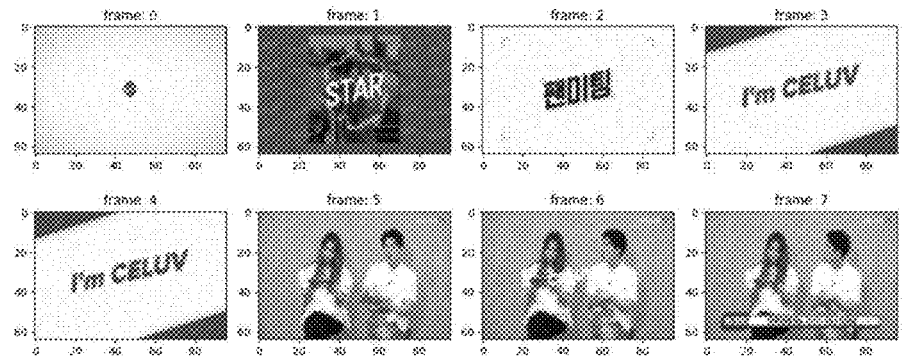
FIG. 6 illustrates an example of an original video and a video being identified.
Figure 6:
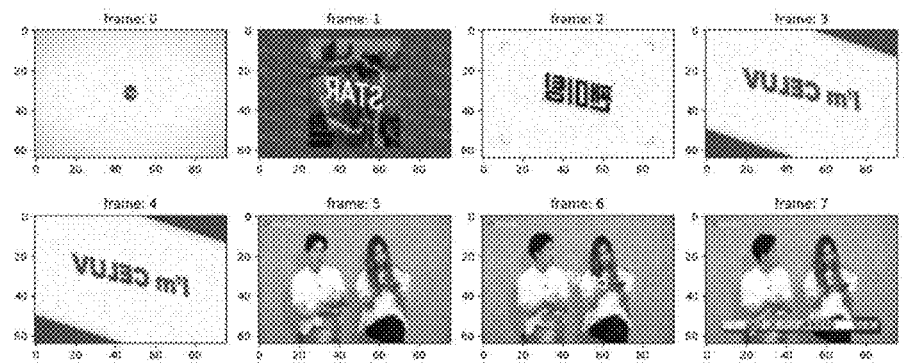
Figure 7:
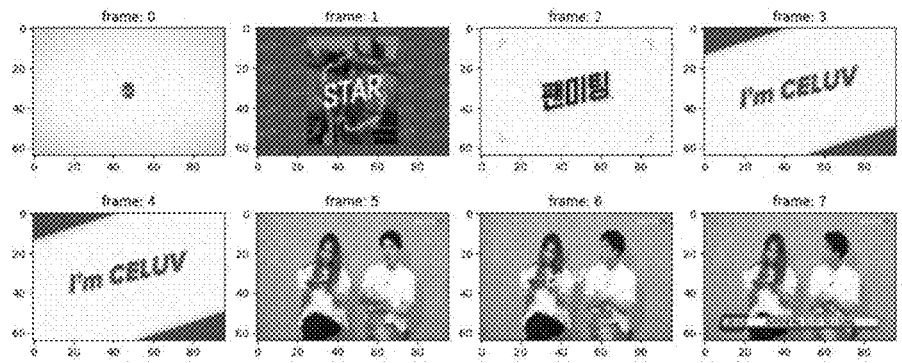
FIG. 7 illustrates another example of an original video and a video being identified.
Figure 7:
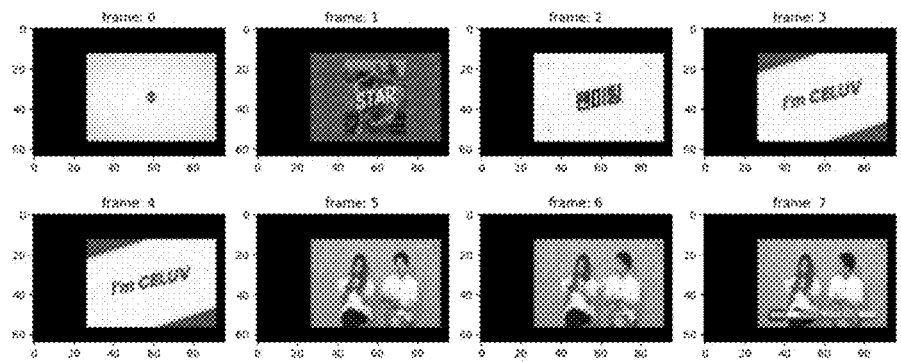

FIGS. 6 and 7 illustrate examples of original videos 610 and 710 and videos 620 and 720 being identified. The videos 620 and 720 being identified may be altered in certain ways from the original videos 610 and 710 in order to avoid copyright infringement. For example, the videos 620 and 720 being identified may be obtained by adding noise (e.g., Gaussian noise) to the original video, lowering the quality of the original video, blurring (e.g., Gaussian blur) the original video, deleting (e.g., cropping) a portion of the original video, adjusting the brightness of the original video, applying gamma (e.g., gamma correction) to the original video, enlarging or reducing the original video, inserted a meaningless background (e.g., zoom and shift), flipping the original video left and right or up and down, and the like.

If the video is altered, while visually important information in the video, the varying pattern of the maximum values of the average pixel values in each axis may be similar to that in the original video. Therefore, as described above, by calculating a fingerprint of a video based on the temporal correlation of the maximum values of the average pixel values in each axis, it is possible to effectively identify whether or not the video being identified is a tampered video.

FIG. 6 illustrates examples of videos 620 being identified, which are obtained by flipping eight original videos 610 (frames 0 to 7) left and right, and FIG. 7 illustrates examples of videos 720 being identified, which are obtained by reducing the image size of the original videos 710, moving these to the right side of each frame, and then inserting a black background. If the original video is altered by being flipped left and right and/or flipped up and down, or if the original video is altered by being enlarged/reduced, and moved and inserted with a meaningless background, it is difficult for the known method to identify whether or not the video is a tampered video because the characteristics of the fingerprint have changed. Meanwhile, even if the original video is altered by being flipped left and right and/or up and down, the maximum values of the average pixel values in the horizontal axis of each frame, and the maximum values of the average pixel values in the vertical axis of each frame in the tampered video may be the same as those in the original video. Likewise, even if the original video is altered by being enlarged/reduced, and moved and inserted with a meaningless background, the maximum values of the average pixel values in the horizontal axis of each frame, and the maximum values of the average pixel values in the vertical axis of each frame in the tampered video may be the same as or similar to those in the original video. Accordingly, in the examples of the present disclosure, by calculating the fingerprint based on the temporal correlation of the maximum values of the average pixel values in each axis, it is also possible to effectively identify whether or not the video is tampered video, which would not be identifiable by conventional methods.

Figure 8:
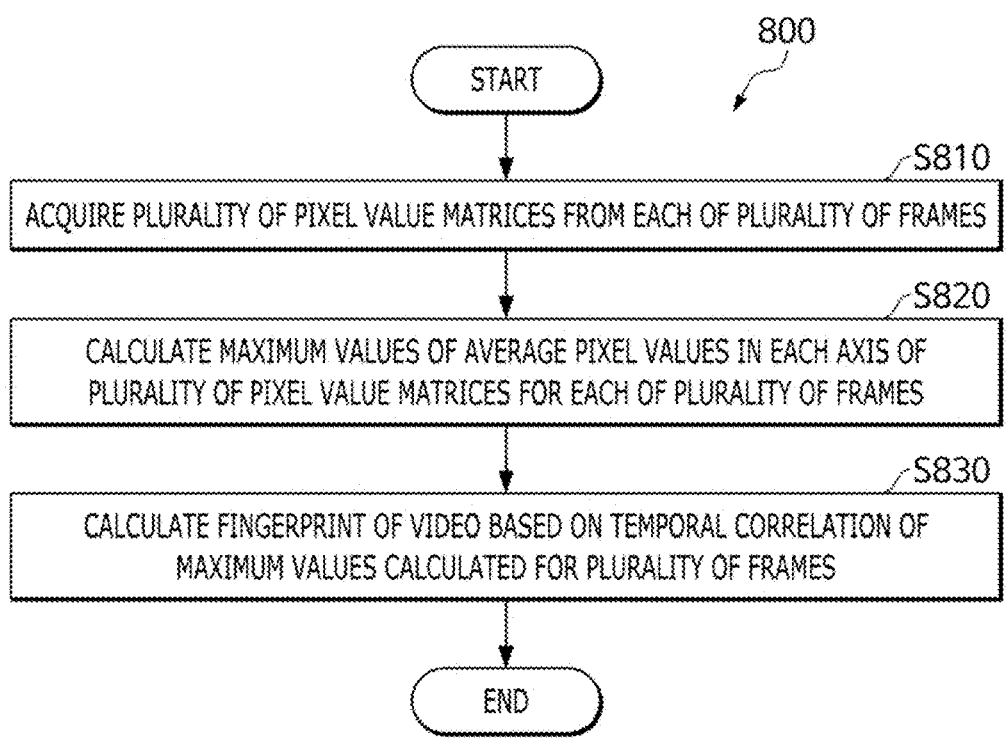
FIG. 8 is a flowchart illustrating an example of a method for extracting a fingerprint of a video.

FIG. 8 is a flowchart illustrating an example of a method 800 for extracting a fingerprint of a video. Each operation of the method 800 may be performed by the computing device 200 or one or more processors 220. The method 800 may be initiated by the processor 220 obtaining a plurality of pixel value matrices from each of a plurality of frames, at S810.

The processor 220 may calculate the maximum values of the average pixel values in each axis of the plurality of pixel value matrices for each of the plurality of frames, at S820. For example, the processor 220 may calculate the maximum values of the average pixel values in the horizontal axis and the maximum values of the average pixel values in the vertical axis for each of the plurality of frames.

Then, the processor 220 may calculate the fingerprint of the video based on the temporal correlation of the maximum values calculated for the plurality of frames, at S830. The processor 220 may perform discrete cosine transform on the maximum values calculated for each of the plurality of frames to calculate the fingerprint of the video. For example, the processor 220 may calculate the first DCT coefficient by performing discrete cosine transform on the maximum values of the average pixel values in the horizontal axis of the plurality of pixel value matrices of each of the plurality of frames. In addition, the processor 220 may calculate the second DCT coefficient by performing discrete cosine transform on the maximum value of the average pixel values in the vertical axis of the plurality of pixel value matrices of each of the plurality of frames. The processor 220 may combine the first DCT coefficient and the second DCT coefficient to generate a fingerprint of the video. Additionally, the processor 220 may exclude coefficients of a DC component having a basis frequency of 0 from the DCT coefficients (the first and second DCT coefficients) to generate a fingerprint.

Even if the original video is altered, resulting in changes in each pixel value of the video, the varying patterns over time of the maximum values of the averages in each axis may be similar. Accordingly, as described above, by extracting the DCT coefficients from the maximum values of the averages in each the axis, it is possible to effectively identify a tampered video that has alterations applied to the original video.

Figure 9:
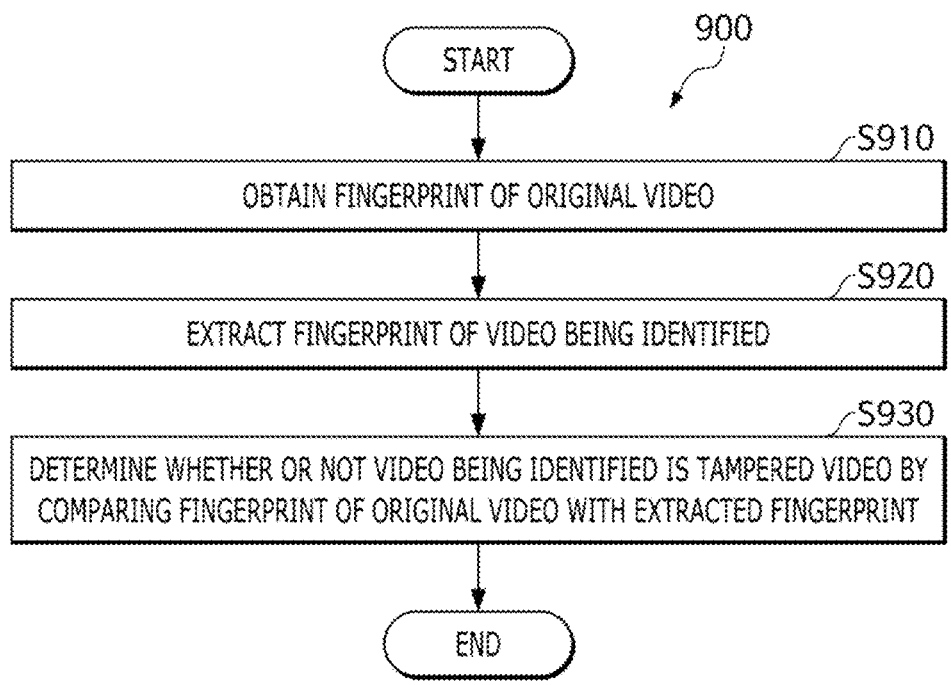
FIG. 9 is a flowchart illustrating an example of a method for identifying whether or not a video is a tampered video.

FIG. 9 is a flowchart illustrating an example of a method 900 for identifying whether or not a video is a tampered video. The processor 220 may obtain a fingerprint of the original video, at S910. For example, the processor 220 may receive the fingerprint of the original video stored in the database or extract the fingerprint of the original video according to the method for extracting the fingerprint of the video according to various examples.

The processor 220 may extract the fingerprint of the video being identified, at S920. The processor 220 may extract the fingerprint of the video being identified according to the method for extracting the fingerprint of the video according to various examples, and may extract the fingerprint of the video being identified according to the same method that is employed to extract the fingerprint of the original video.

The processor 220 may determine whether or not the video being identified is a tampered video, by comparing the obtained fingerprint of the original video with the fingerprint of the extracted video being identified, at S930. It may be determined that the video being identified identical to the original video is a tampered video of the original video. The processor 220 may determine whether or not tampering is present, by inputting the fingerprint of the original video and the fingerprint of the video being identified to a matching algorithm. If at least a portion of the fingerprint of the video being identified is the same as, similar to, or within an error range of at least a portion of the fingerprint of the original video, the matching algorithm may determine that the video being identified is a tampered video of the original video.

The flowcharts illustrated in FIGS. 8 and 9 are merely examples, and may be implemented differently. For example, operations may be added or omitted, or the order of the operations may be changed, or certain operations may be repeatedly performed.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method for extracting a fingerprint of a video having a plurality of frames, the method being executed by one or more processors and comprising:
    extracting the plurality of frames from the video;
    obtaining a plurality of pixel value matrices from each of the plurality of frames;
    calculating maximum values of average pixel values in each axis of the plurality of pixel value matrices for each of the plurality of frames;
    calculating the fingerprint of the video based on a temporal correlation of the maximum values calculated for the plurality of frames; and
    comparing the fingerprint of the video with the fingerprint of an original video and determining if the fingerprint of the video is within an error range of at least a portion of the fingerprint of the original video.

2. The method according to claim 1, wherein the calculating of the maximum values of the average pixel values includes:
    calculating maximum values of average pixel values in a horizontal axis of the plurality of pixel value matrices for each of the plurality of frames; and
    calculating maximum values of average pixel values in a vertical axis of the plurality of pixel value matrices for each of the plurality of frames.

3. The method according to claim 1, wherein the calculating of the fingerprint of the video includes performing discrete cosine transform (DCT) on the maximum values calculated for the plurality of frames.

4. The method according to claim 3, wherein the performing of the discrete cosine transform includes:
    calculating a first DCT coefficient by performing a discrete cosine transform on the maximum values of the average pixel values in the horizontal axis of the plurality of pixel value matrices in each of the plurality of frames;
    calculating a second DCT coefficient by performing a discrete cosine transform on the maximum values of the average pixel values in the vertical axis of the plurality of pixel value matrices in each of the plurality of frames; and
    generating the fingerprint of the video by combining the first DCT coefficient and the second DCT coefficient.

5. The method according to claim 3, wherein the calculating of the fingerprint of the video further includes excluding a coefficient having a basis frequency of 0 from the DCT coefficients calculated by the discrete cosine transform.

6. The method according to claim 1, wherein the calculating of the maximum value of the average pixel values includes:
    calculating the maximum values of the average pixel values in the horizontal axis of the plurality of pixel value matrices, and the maximum values of the average pixel values in the vertical axis of the plurality of pixel value matrices for each of the plurality of frames, and
    the calculating of the fingerprint of the video includes:
    calculating a first DCT coefficient by performing a discrete cosine transform on the maximum values of the average pixel values in the horizontal axis of the plurality of pixel value matrices in each of the plurality of frames;
    calculating a second DCT coefficient by performing a discrete cosine transform on the maximum values of the average pixel values in the vertical axis of the plurality of pixel value matrices in each of the plurality of frames; and
    generating the fingerprint of the video by combining the first DCT coefficient and the second DCT coefficient.

7. The method according to claim 6, wherein the calculating of the fingerprint of the video further includes excluding a coefficient having a basis frequency of 0 from the first DCT coefficient and the second DCT coefficient.

8. The method according to claim 1, further comprising:
    obtaining a fingerprint of an original video; and
    determining whether the video is a tampered video by comparing the obtained fingerprint of the original video with the extracted fingerprint of the video.

9. A non-transitory computer-readable recording medium storing instructions that, when executed by one or more processors, cause performance of the method according to claim 1.

10. A computing device, comprising:
    a memory; and one or more processors connected to the memory and configured to execute one or more computer-readable programs stored in the memory for extracting a fingerprint of a video, wherein
the one or more programs include instructions for:
extracting the plurality of frames from the video;
obtaining a plurality of pixel value matrices from each of a plurality of frames included in a video;
calculating maximum values of average pixel values in each axis of the plurality of pixel value matrices for each of the plurality of frames;
calculating a fingerprint of the video based on a temporal correlation of the maximum values calculated for the plurality of frames; and
comparing the fingerprint of the video with the fingerprint of an original video and determining if the fingerprint of the video is within an error range of at least a portion of the fingerprint of the original video.

11. The computing device according to claim 10, wherein the calculating of the maximum values of the average pixel values includes:
calculating maximum values of average pixel values in a horizontal axis of the plurality of pixel value matrices for each of the plurality of frames; and
calculating maximum values of average pixel values in a vertical axis of the plurality of pixel value matrices for each of the plurality of frames.

12. The computing device according to claim 10, wherein the calculating of the fingerprint of the video includes performing discrete cosine transform on the maximum values calculated for each of the plurality of frames.

13. The computing device according to claim 12, wherein the performing of the discrete cosine transform includes:
calculating a first DCT coefficient by performing a discrete cosine transform on the maximum values of the average pixel values in the horizontal axis of the plurality of pixel value matrices in each of the plurality of frames;
calculating a second DCT coefficient by performing a discrete cosine transform on the maximum values of the average pixel values in the vertical axis of the plurality of pixel value matrices in each of the plurality of frames; and
generating the fingerprint of the video by combining the first DCT coefficient and the second DCT coefficient.

14. The computing device according to claim 12, wherein the calculating of the fingerprint of the video includes excluding a coefficient having a basis frequency of 0 from the DCT coefficients calculated by the discrete cosine transform.

15. The computing device according to claim 10, wherein the calculating of the maximum value of the average pixel values includes:
calculating the maximum values of the average pixel values in the horizontal axis of the plurality of pixel value matrices, and the maximum values of the average pixel values in the vertical axis of the plurality of pixel value matrices for each of the plurality of frames, and
the calculating of the fingerprint of the video includes:
calculating a first DCT coefficient by performing a discrete cosine transform on the maximum values of the average pixel values in the horizontal axis of the plurality of pixel value matrices in each of the plurality of frames;
calculating a second DCT coefficient by performing a discrete cosine transform on the maximum values of the average pixel values in the vertical axis of the plurality of pixel value matrices in each of the plurality of frames; and
generating the fingerprint of the video by combining the first DCT coefficient and the second DCT coefficient.

16. The computing device according to claim 15, wherein the calculating of the fingerprint of the video further includes excluding a coefficient having a basis frequency of 0 from the first DCT coefficient and the second DCT coefficient.

17. The computing device according to claim 10, wherein the one or more programs further include instructions for:
obtaining a fingerprint of an original video; and
determining whether the video is a tampered video by comparing the obtained fingerprint of the original video with the extracted fingerprint of the video.

* * * * *